US006999788B2

(12) United States Patent
Takeda et al.

(10) Patent No.: US 6,999,788 B2
(45) Date of Patent: Feb. 14, 2006

(54) RADIO TRANSMITTER THAT DETERMINES PROPER STANDARD

(75) Inventors: Yasuhiro Takeda, Tokyo (JP); Masashi Naito, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 412 days.

(21) Appl. No.: 10/290,257

(22) Filed: Nov. 8, 2002

(65) Prior Publication Data

US 2003/0100277 A1 May 29, 2003

(30) Foreign Application Priority Data

Nov. 29, 2001 (JP) ............................. 2001-364204

(51) Int. Cl.
*H04B 1/02* (2006.01)
*H04B 7/212* (2006.01)
*H01Q 11/12* (2006.01)
*H04M 3/00* (2006.01)
*H04J 3/00* (2006.01)

(52) U.S. Cl. ..................... 455/552.1; 455/92; 455/93; 455/127.4; 455/419; 370/342; 370/345; 370/347

(58) Field of Classification Search ................. 455/92, 455/93, 127.4, 419, 552.1; 370/342, 345, 370/347

See application file for complete search history.

(56) References Cited

U.S. PATENT DOCUMENTS 6,799,203 B1 * 9/2004 Oommen .................... 709/219

* cited by examiner

*Primary Examiner*—Nick Corsaro
*Assistant Examiner*—Yuwen Pan
(74) *Attorney, Agent, or Firm*—McGinn IP Law Group, PLLC

(57) ABSTRACT

A radio transmitter includes a CPU, functioning to allow the radio signal to be transmitted in event of a decision result that the radio signal transmission should be permitted but, in event of a decision result that the radio signal transmission should not be permitted, functions to allow the radio signal to be stopped and to instruct the alarm output section to output an abnormal alarm; a distributor, functioning to distribute a radio signal outputted from the radio transmitter to the outside; a transmitter; a spectral analysis, functioning to perform a frequency analysis of the radio signal according to the standard information; a power comparator section, to decide whether or not a transmission of the radio signal should be permitted by comparing the result of the frequency analysis with the standard information; and an alarm output section.

1 Claim, 4 Drawing Sheets

PRIOR ART

RADIO TRANSMITTER THAT DETERMINES PROPER STANDARD

BACKGROUND OF THE INVENTION

1. Field of the Invention

The present invention relates to a radio transmitter adapted to change its communication mode by externally downloading a predetermined software and, in particular, the present invention relates to a radio transmitter adapted to prevent a radio signal which is incompliant with (does not comply with) a predetermined standard from being transmitted.

2. Description of the Related Art

Recently, there is proposed a software radio transmission technology by which a radio transmitter can cope with a different communication mode by downloading a software associated with the different communication mode via a wire communication or a radio communication from outside. A conventional radio transmitter using the software radio transmission technology will be described with reference to FIG. 7. FIG. 7 is a schematic block diagram illustrating an exemplary one of conventional radio transmitters. The conventional radio transmitter comprises: a CPU 101, a memory 102, a modulation section 103, a D/A section 104 and a transmitter section 105.

The memory 102 is comprised of a fundamental software storing region and a communication mode software storing section. What is meant by the fundamental software is a software required for a basic operation of the radio transmitter. Furthermore, what is meant by the communication mode software is a software required for a modulation and the like and may previously be written into the memory 102. The CPU 101 is configured to control the radio transmitter itself according to the fundamental software and store a communication mode software into the memory 102 when the communication mode software is inputted via wire communication or radio communication from the outside.

In a transmission operation of the radio transmitter, the CPU 101 functions to output the communication mode software stored in the memory 102 to the modulation section 103. In response thereto, the modulation section 103 functions to output a digital modulation signal which is modulated according to the communication mode software to the D/A section 104. The D/A section 104 functions to convert the digital modulated signal to an analog modulation signal and thereafter output the latter to the transmitter section 105. The transmitter section 105 functions to process the analog modulation signal by a frequency conversion, a electric power amplification and a band limitation and then output it to the outside as a radio signal. It should be noted that a radio signal to be transmitted must be compliant with predetermined standard or standards required for a radio law and a system operation.

Normally, a decision whether or not a radio transmitter is compliant with (complies with) various standards required for the radio law and the system operation is performed at the shipment time of the radio transmitter or periodically after that shipment by its manufacturer. However, it is not surely clear that a radio signal to be transmitted by using the software radio technology will be transmitted with absolutely right spectral because its communication mode changes in response to a kind of the downloaded communication mode software.

Furthermore, there is a fear that, during a transmission of a radio signal from the radio transmitter, a leakage power between adjacent channels tends not to be compliant with the standard required for the radio law and the system operation due to, for example, a deterioration with time and an unpredictable factor occurred in the radio transmitter. Still further, although a communication mode software is downloaded normally with an authentication for a safety purpose, there is a possibility that an injustice communication mode software due to the computer virus or the like will be downloaded, as a result of which a radio signal which is incompliant with the standard may be transmitted. In the event that such a radio signal incompliant with the standard has been transmitted, it is expected that a communication for a user who uses its adjacent channel for example is disabled. However, it is impossible for the conventional radio transmitter to stop a transmission of such a radio signal incompliant with the standard or issue an emergency or abnormal alarm.

In order to address the above-mentioned problems, an object of the present invention is to provide a radio transmitter capable of normally monitoring a radio signal to be transmitted, stopping the radio signal transmission and outputting an emergency alarm in event that the radio signal is incompliant with a predetermined standard.

SUMMARY OF THE INVENTION

According to an aspect of the present invention, there is provided a radio transmitter adapted to capture a software associated with a communication mode and a standard information from outside and transmit a radio signal generated based on the software, characterized by subjecting the radio signal to a frequency analysis and a decision according to the standard information so as to transmit the radio signal if a result of the decision is compliant with a standard of the standard information but stop the radio signal transmission with an output of an alarm if the result of the decision is incompliant with the standard of the standard information.

With the radio transmitter thus configured, a state of the signal to be transmitted is always monitored such that such a radio signal as being incompliant with the standard cannot be transmitted. In the meantime, in an embodiment of the present invention, the radio signal as mentioned above corresponds to, for example, a radio signal to be outputted from the transmitter 105 or an analog modulation signal to be outputted from the D/A section 104.

These and other aspects of the present invention will be apparent from the following specific description, given by way of example, with reference to the accompanying drawings.

DESCRIPTION OF PREFERRED EMBODIMENTS

Hereinafter, preferred embodiments of the present invention will be described in detail with reference to the accompanying drawings.

Figure 1:
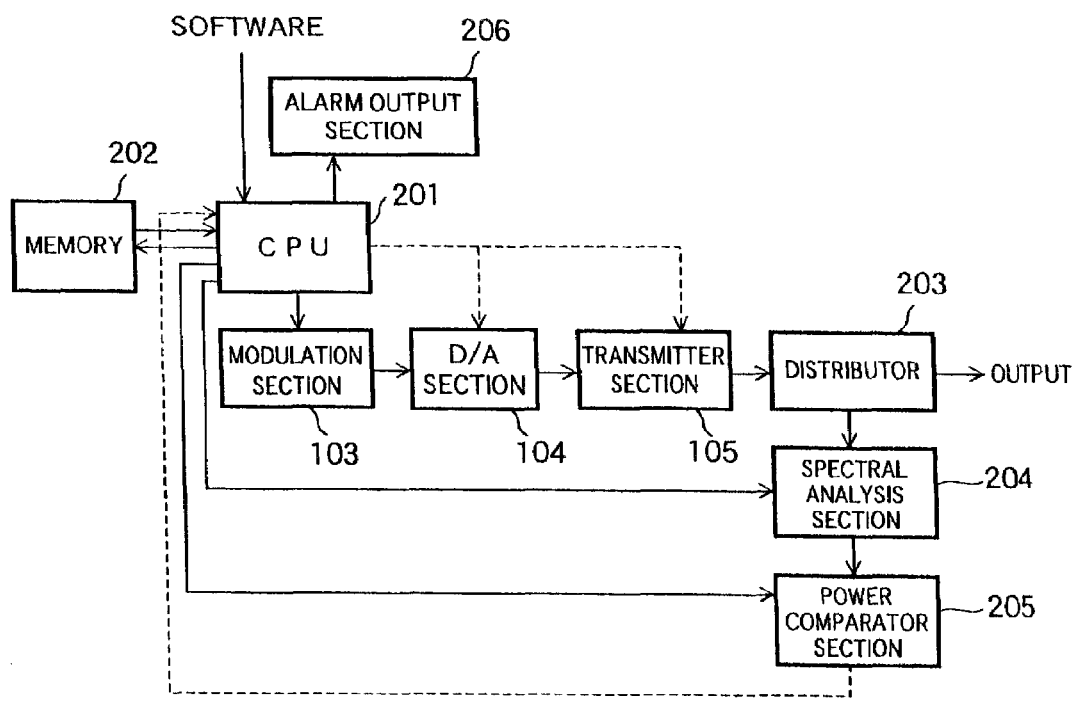
FIG. 1 is a schematic block diagram illustrating a radio transmitter according to an embodiment of the present invention.
Figure 7:
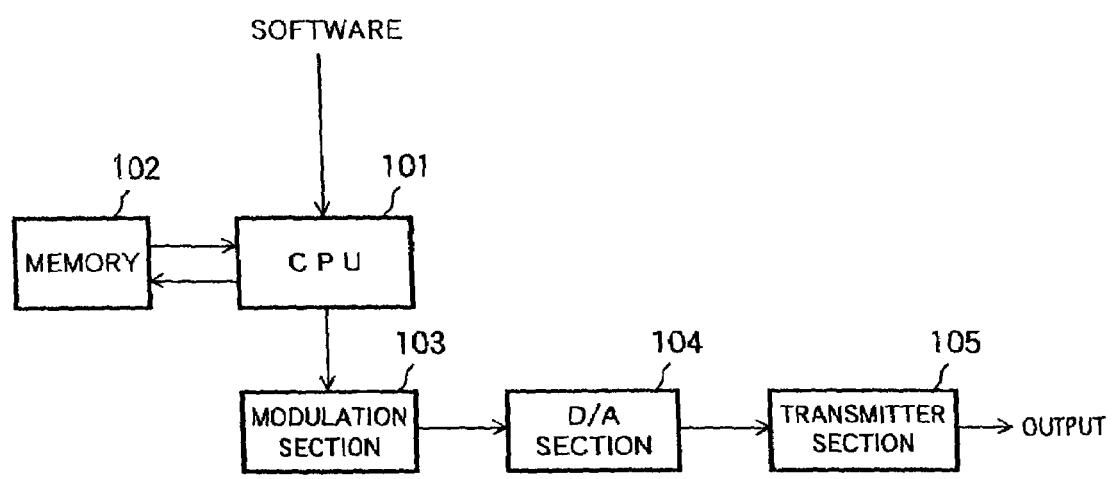
FIG. 7 is a schematic block diagram illustrating one example of conventional radio transmitters.

Embodiment 1:

FIG. 1 is a schematic block diagram illustrating a radio transmitter according to an embodiment of the present invention. In this FIG. 1, similar reference numerals to those of FIG. 7 are used to identify similar sections and/or parts. Therefore, Explanations regarding those sections and/or parts are omitted from the following description.

In FIG. 1 configuration, there is newly introduced a distributor 203, a spectral analysis section 204, a power comparator section 205 and an alarm output section 206. Furthermore, the radio transmitter of FIG. 1 comprises a memory 202 instead of the memory 102 of FIG. 7 and a CPU 201 instead of the CPU 101.

Hereinafter, the following detailed description is given for the CPU 201, the memory 202, the distributor 203, the spectral analysis section 204, the power comparator section 205 and alarm output section 206 which are newly introduced into the radio transmitter of FIG. 1. The memory 202 includes a standard information storing region in addition to a fundamental software storing region and a communication mode software storing region. The standard information includes items such as an occupied bandwidth and a power leakage between neighboring channels. What is mean by the standard information indicates a standard which is provided for a radio signal to be transmitted by using a communication mode which consists of a calculation reference and a decision reference. The calculation reference indicates a reference for calculating the occupied bandwidth and the power leakage between neighboring channels of the radio signal by the spectral analysis section 204. The decision reference indicates a reference for deciding the occupied bandwidth and the power leakage between neighboring channels of the radio signal by the power comparator section 205. This standard information may be either downloaded into the memory 202 from the outside along with the communication mode software or previously written into the memory 202.

The CPU 201 functions to control the radio transmitter according to the fundamental software and store into the memory 202 the communication mode software and the standard information when they are inputted thereinto from the outside via a wire communication or a radio communication. Also, at a radio signal transmission time, the CPU 201 functions to output the communication mode software stored in the memory 202 to the modulation section 103, and read the standard information stored in the memory 202 so as to output the calculation reference of the standard information to the spectral analysis section 204 and output the decision reference thereof to the power comparator section 205.

The distributor 203 functions to output the radio signal outputted from the transmitter section 105 to the outside and the spectral analysis section 204. The spectral analysis section 204 functions to perform a frequency analysis by using a spectral analyzers and an FET for example and calculating the occupied bandwidth and the power leakage between neighboring channels according to the calculation reference gained from the CPU 201. The calculated occupied bandwidth and power leakage are outputted as an analysis result to the power comparator section 205. The power comparator section 205 functions to decide or estimate the analysis result according to the decision reference gained from the CPU 201. That is, in response to its comparison result between the analysis result and the decision reference, the power comparator section 205 functions to decide whether or not the radio signal transmission should be permitted and then to output its decision result to the CPU 201.

The CPU 201 control the D/A section 104 and the transmitter section 105 based on the decision result from the power comparator section 205. In detail, if the decision result indicates that the radio signal transmission should be permitted, then the CPU 201 functions to operate the D/A section 104 and the transmitter section 105 for the radio signal transmission. On the other, if the decision result indicates that the radio signal transmission should not be permitted, then the CPU 201 functions to stop the operations of the D/A section 104 and the transmitter section 105 and then to output an instruction of an abnormal alarm to the alarm output section 206. Then, the alarm output section 206 functions to output or issue the abnormal alarm according the instruction from the CPU 201.

Figure 2:
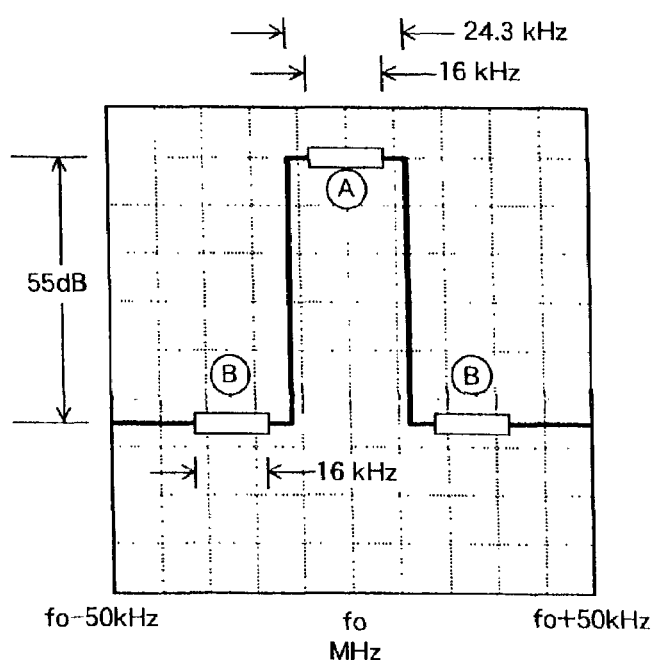
FIG. 2 is a graph showing a spectral example of a standard information.

Next, the standard information will be illustrated with examples. FIG. 2 is an example showing a spectral of the standard information, wherein a y-axis denotes power while an x-axis denotes frequency. Specific values of the standard information of FIG. 2 are as follows:

1. Occupied bandwidth is not less than 16 kHz and not greater than 24.3 kHz;
2. Power leakage between neighboring channels is not greater than −55 dB if $f_0$ is ±25 kHz and bandwidth is 16 kHz.

As shown in FIG. 2, the $f_0$ denotes a central frequency of the radio signal to be transmitted. The occupied bandwidth denotes an occupied bandwidth of the radio signal to be transmitted. The power leakage between neighboring channels denotes a calculated power ratio of a region A to a region B on the assumption that the region A is a region for the bandwidth 16 kHz with a center of $f_0$ and the region B is a region for the bandwidth 16 kHz with either one of two centers of $f_0$ ±25 kHz.

Next, the spectral analysis section 204 and the power comparator section 205 will be illustrated with an instantiation. Here, the example of FIG. 2 is used as a standard information in the following description.

Figure 3:
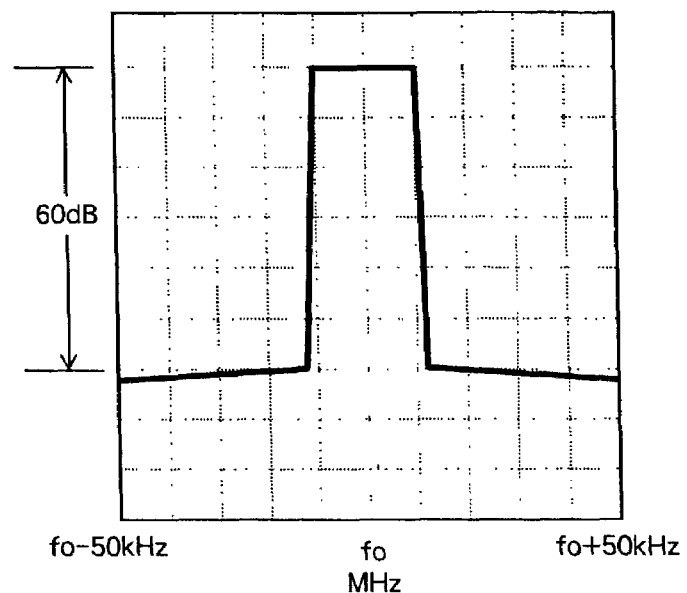
FIG. 3 is a graph showing a spectral example compliant with the standard.

First of all, an operation of the radio signal in the case of it being compliant with the standard will be described. FIG. 3 is one example showing spectral which is compliant with the standard. In FIG. 3, a y-axis denotes power while an x-axis denotes frequency. The occupied bandwidth of the spectral of FIG. 3 is compliant with "not less than 16 kHz and not greater than 24.3 kHz" as the decision reference. Furthermore, the power leakage between neighboring channels in the spectral of FIG. 3 is compliant with "not greater than −55 dB" as the decision reference. Accordingly, the power comparator section 205 functions to output to the CPU section 201 a decision result that the radio signal transmission should be permitted. In response thereto, the CPU section 201 functions to activate the operations of the D/A section 104 and the transmitter section 105 so as to make them to perform the radio signal transmission.

Figure 4:
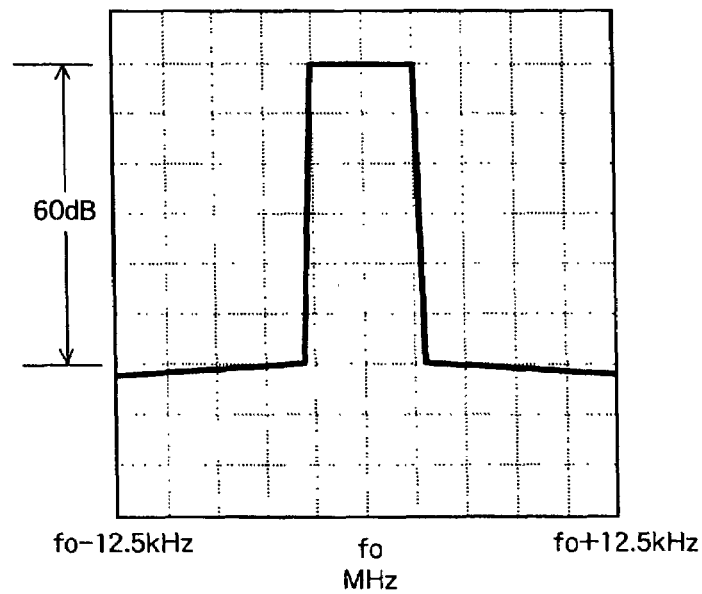
FIG. 4 is a graph showing a spectral example incompliant with the standard.

Next, an operation of the radio signal in the case of the occupied bandwidth of the radio signal being incompliant with the standard due to an affection of a virus or the like will be described. FIG. 4 is one example showing spectral which is incompliant with the standard. In FIG. 4, a y-axis denotes power while an x-axis denotes frequency. The power leakage between neighboring channels of FIG. 4 is compliant with "not greater than −55 dB" as the decision reference, but the occupied bandwidth of the spectral is incompliant with "not less than 16 kHZ and not greater than 24.3 kHz" as the decision reference. Accordingly, the power comparator section 205 functions to output to the CPU section 201 a decision result that the radio signal transmission should not be permitted. The CPU section 201 functions to stop the operations of the D/A section 104 and the transmitter section 105 so as to stop the radio signal transmission and then to activate the alarm output section 206 so as to issue or output an abnormal alarm therefrom.

Figure 5:
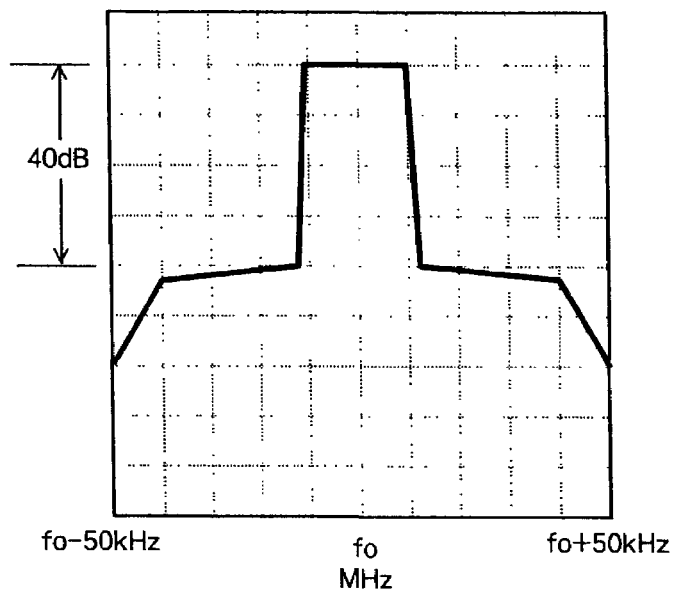
FIG. 5 is a graph showing another spectral example incompliant with the standard.

Next, an operation of the radio signal in the case of the power leakage between neighboring channels thereof being incompliant with the standard due to a deterioration with time and an unpredictable factor will be described. FIG. 5 is another example showing spectral which is incompliant with the standard. In FIG. 5, a y-axis denotes power while an x-axis denotes frequency. The occupied bandwidth of the spectral of FIG. 5 is compliant with "not less than 16 kHz and not greater than 24.3 kHz" as the decision reference, but the power leakage between neighboring channels is incompliant with "not greater than −55 dB" as is the decision reference. Accordingly, the power comparator section 205 functions to output to the CPU section 201 a decision result that the radio signal transmission should not be permitted. The CPU section 201 functions to stop the operations of the D/A section 104 and the transmitter section 105 so as to stop the radio signal transmission and then to activate the alarm output section 206 so as to output the abnormal alarm therefrom.

Figure 6:
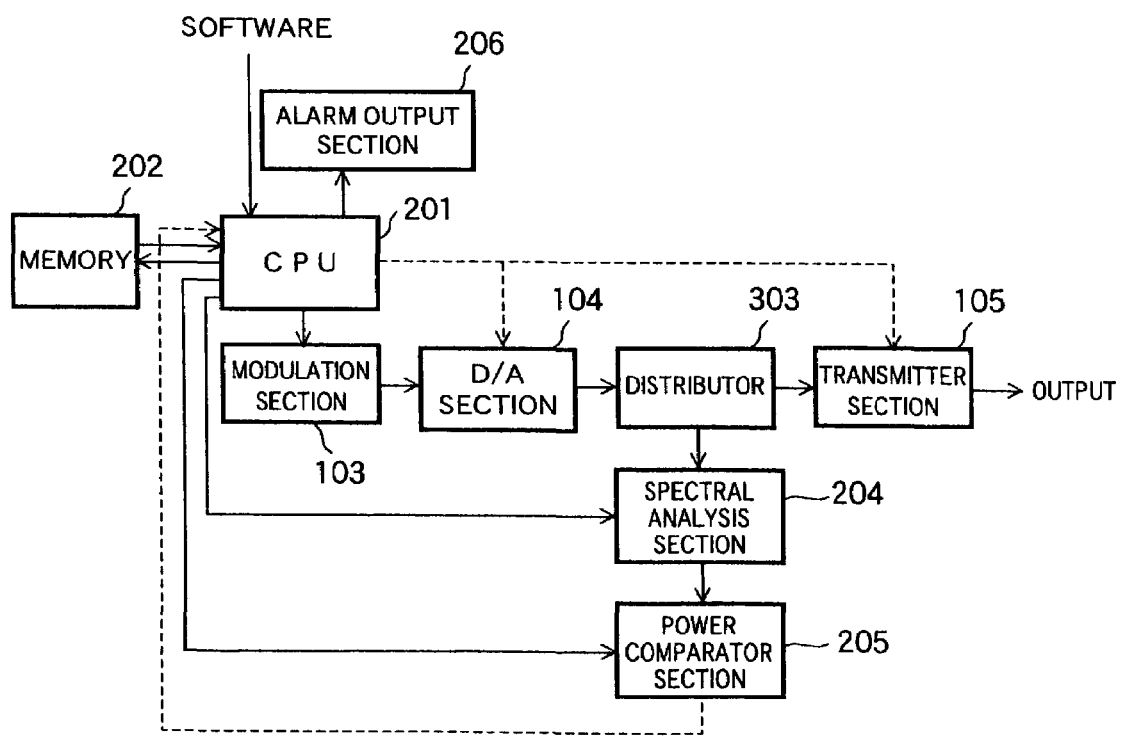
FIG. 6 is a schematic block diagram illustrating a radio transmitter according to another embodiment of the present invention.

Embodiment 2:

FIG. 6 is a schematic block diagram illustrating a radio transmitter according to another embodiment of the present invention. In this FIG. 6, similar reference numerals to those of FIG. 1 are used to identify similar sections and/or parts. Therefore, Explanations regarding those sections and/or parts are omitted from the following description. In a configuration of this embodiment 2, a distributor 303 instead of the distributor 203 of FIG. 1 is connected to a post-stage of the D/A section 104. This distributor 303 functions to distribute an output of the D/A section 104 to the transmitter 105 and the spectral analysis section 204. The other components are similar to those of the embodiment 1. In this case, the standard information includes a calculation reference and a decision reference with respect to an analog modulated signal instead of the radio signal. The spectral analysis section 204 functions to perform a frequency analysis of the analog modulated signal instead of the radio signal.

As described above, the present invention provides a radio transmitter in which it is normally decided whether or not a radio signal is compliant with a predetermined standard so as to perform a stoppage of a transmission of a radio signal which is incompliant with the standard and an output of an abnormal alarm. Therefore, it is advantageously possible to avoid a transmission of a radio signal out of the standard due to an affection of a virus and/or a deterioration with time and an inability in transmission via an adjacent channel to one for the radio signal out of the standard.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A radio transmitter adapted to capture a software associated with a communication mode and a standard information from outside and transmit a radio signal generated based on the software, characterized by subjecting the radio signal to a frequency analysis and a decision according to the standard information so as to transmit the radio signal if a result of the decision is compliant with a standard of the standard information but to stop the radio signal transmission and to issue an alarm output if the result of the decision is incompliant with the standard of the standard information, comprising: a CPU; a distributor; a transmitter; a spectral analysis; a power comparator section and an alarm output section, and wherein the distributor functions to distribute a radio signal outputted from the radio transmitter to outside and the spectral analysis section, the spectral section functions to perform a frequency analysis of the radio signal according to the standard information, the power comparator section functions to decide whether or not a transmission of the radio signal should be permitted by comparing the result of the frequency analysis with the standard information, the CPU functions to allow the radio signal to be transmitted in event of a decision result that the radio signal transmission should be permitted but, in event of a decision result that the radio signal transmission should not be permitted, the CPU functions to allow the radio signal to be stopped and to instruct the alarm output section to output an abnormal alarm.

\* \* \* \* \*